United States Patent [19]
Rochat

[11] 3,951,537
[45] Apr. 20, 1976

[54] SLIDE PROJECTOR CONTROL DEVICE

[75] Inventor: Charles-Louis Rochat, Veyrier, Switzerland

[73] Assignee: Pignons S.A., Ballaigues, Switzerland

[22] Filed: Aug. 1, 1974

[21] Appl. No.: 493,746

[30]    Foreign Application Priority Data
        Aug. 9, 1973    Switzerland.................... 11497/73

[52] U.S. Cl. ............................................... 353/85
[51] Int. Cl.² ......................................... G03D 21/20
[58] Field of Search ............................... 353/85, 86

[56]           References Cited
              UNITED STATES PATENTS 3,282,155   11/1966   Cleary et al. ...................... 353/86
3,544,210   12/1970   Goetz ................................. 353/86
3,622,236   11/1971   Novy .................................. 353/86

*Primary Examiner*—Harry N. Haroian
*Attorney, Agent, or Firm*—Emory L. Groff, Jr.

[57]           ABSTRACT

The lamps of two slide projectors are each supplied by the secondary winding of a transformer. Each secondary winding has a half-wave rectifier and a current-control element in series with its lamp. Terminals are provided for bridging the rectifier and current-control element to enable each projector to be used separately. The two secondary windings and rectifier can also be connected to form a full-wave rectifying unit with a median terminal feeding the two lamps each in series with its current-control element, to enable projection of a series of slides with simultaneous fading-in and fading-out of successive slides.

4 Claims, 1 Drawing Figure

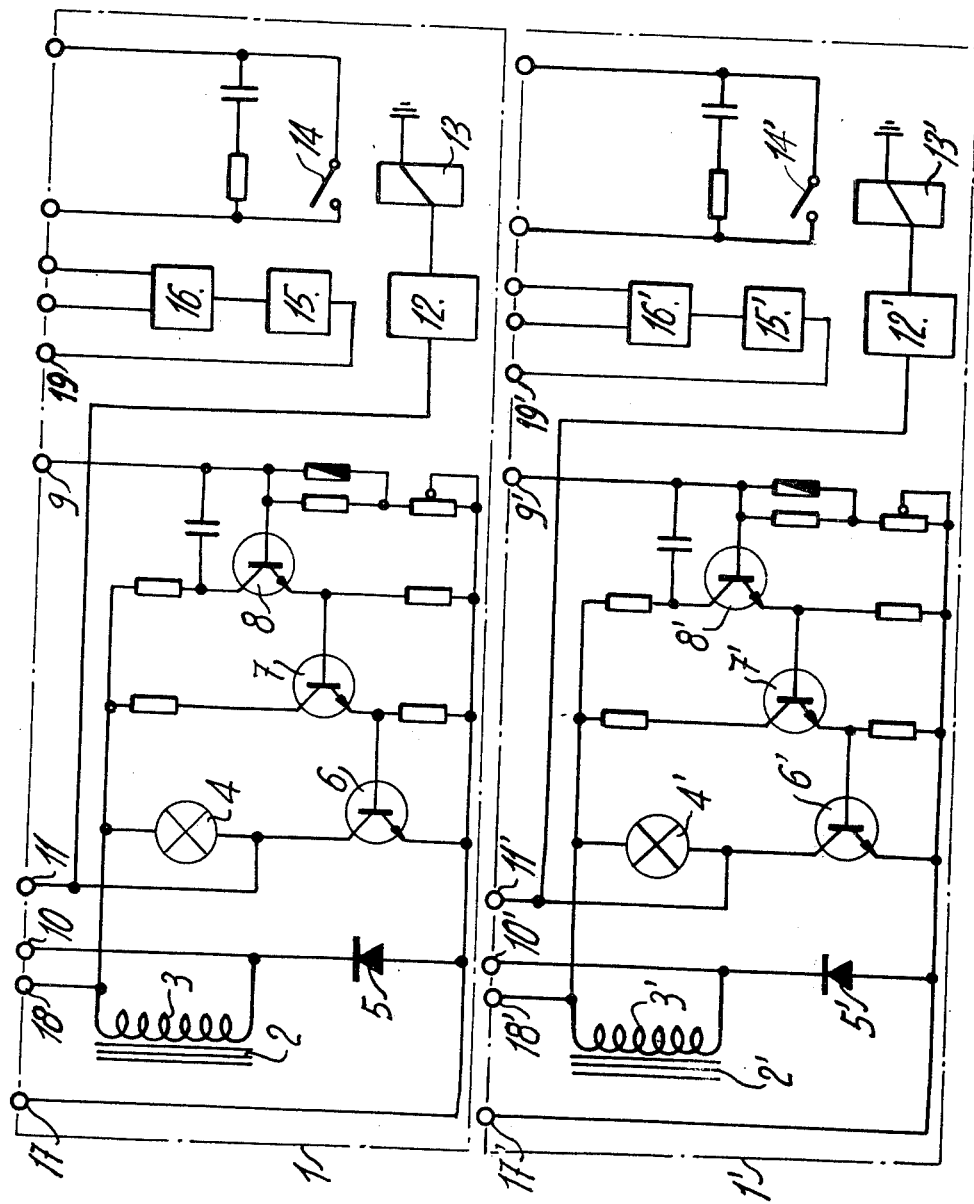

SLIDE PROJECTOR CONTROL DEVICE

The invention relates to transparent slide projectors.

When a series of transparent slides are projected, passage from one slide to the next generally takes place abruptly, which is tiring for the spectators. To remedy this drawback, it has already been proposed to pass from one slide to the next by a merging technique, i.e. by progressively reducing the intensity of projection of the slide which is to disappear and simultaneously increasing the luminous intensity of the new slide to be projected, in other words fading out one slide and fading in the next. However, this projection technique requires the use of a relatively complicated and expensive material, it being necessary to employ two projectors and a control device able to supply synchronized orders to each of the projectors.

An aim of the invention is to enable a linked merging projection technique by relatively simple devices of low bulk.

The invention concerns a device for controlling at least two transparent-slide projector lamps, each lamp being supplied by a secondary winding of at least one transformer, characterized in that each secondary winding delivers to a circuit including, in series with the lamp, a rectifying element with unidirectional conductivity and a current-control element; means for enabling bridging said two elements to remove the lamp from their influence; and connection means for enabling the two secondary windings and the two rectifier elements to be connected in series to form a full-wave rectifying unit with a median terminal feeding the two lamps each in series with its current control element.

The single FIGURE of the accompanying drawing schematically shows, by way of example, an embodiment of a device according to the invention.

In this embodiment, the device comprises two identical parts each lodged in a transparent-slide projector whose casings are schematically represented by boxes 1 and 1' in dotted-dashed lines. The drawing shows only those parts of the electrical circuitry of the projectors which pertain to illumination of the projection lamps, but of course each of the projectors also includes an objective with a passageway for holding a slide in a projection position and a device for enabling changing of the slides.

As the two parts are identical, only one will be described hereinafter, the corresponding components of the other part bearing the same reference numerals but with a prime designation.

Each part comprises a transformer 2 whose primary winding is not shown in the drawing and whose secondary winding 3 supplies a projection lamp 4. For this purpose, the secondary winding 3 feeds a circuit comprising, in series with the lamp 4, a rectifier element with unidirectional conductivity (i.e. a half-wave rectifier), for example a silicon diode rectifier element 5, and a current-control means comprising a circuit containing an element constituted by a transistor 6. This transistor 6 forms the output stage of a d.c. amplifier notably including two other transistors 7 and 8 and a lead-in terminal 9.

The point of liason between the secondary winding 3 and diode 5 is connected to an external terminal 10, whereas the point of liason between lamp 4 and transistor 6 is connected to another external terminal 11. It can be seen that by electrically connecting the terminals 10 and 11, the elements 5 and 6 are bridged and there is thus obtained a direct connection of lamp 4 to the secondary winding 3.

The terminal 11 is connected to the lead-in of a monostable 12 whose time of instability is of the order of one second, or even less, and which reacts upon extinction of lamp 4 to energize a relay 13 whose contact 14 controls a slide changing device, not shown, of a conventional type.

When it is desired to project slides using a single projector, the terminals 10 and 11 of this projector are connected together to directly connect lamp 4 to the secondary winding 3 of transformer 2. In this case, the amplifier formed by transistors 6 to 8 plays no part and it is of course not possible to employ the linked merging technique.

To the contrary, if the user has two like projectors, as illustrated in the drawing by 1 and 1', external connection terminals 17 and 18 of one projector may be connected to the terminals 17' and 18' of the other projector. In this manner, the secondary windings of the two transformers are connected in series to form, with the diodes 5 and 5', a full-wave rectifier with a median terminal. Each projection lamp is thus supplied, when its current-control transistor 6 is conducting, by a full-wave rectifier current instead of a normal alternating current when the terminals 10 and 11 are shunted. Hence, whichever lamp is on, the same luminous power is obtained whatever be its mode of connection, i.e. whether it is connected directly to the secondary winding of a transformer, or connected to the full-wave rectifier formed by the transformers 2 and 2' and the diodes 5 and 5'.

The terminal 11 is submitted to the potential of one of the terminals of lamp 4 and controls monostable 12. A given time after having received a pulse at its lead-in, monostable 12 gives a pulse at its lead-out which controls changing of the slide of the projector whose lamp is off. Changing of the slide is triggered by a pulse applied by manual actuating means at a terminal 19 to a monostable trigger 15 which gives a pulse to a circuit 16 whose two output control terminals are connected to terminals 9 and 9'. This circuit 16 is a type of bistable in which the passage from one state to the other takes place progressively during an adjustable time, for example from half a second to 5 seconds. When the potential increases at one of the lead-outs of this circuit, it diminishes at its other lead-out, and vice versa. In this manner, there is obtained a progressive illumination of one projection lamp at the same time as a progressive extinction of the other lamp. As soon as one lamp 4 is off, the monostable 12 of the same projector actuates the slide change-over mechanism.

It is clear that for reasons of rationalization of manufacture, the monostables 12 and 15 and circuit 16 may be included in each projector, even though during operation with two projectors only one of these circuits is necessary. As a variation, it is of course possible to provide a separate unit including the elements 12 to 16 in a casing independent of the projectors. In this manner, the illuminating circuit of each projector would now only include a transformer 2, lamp 4, rectifier 5 and the amplifier controlled by terminal 9. This independent casing would thus form a common control unit for the two parts of the device and which the user would need to acquire only when he decided to acquire a second projector to be able to project with linked merging. Even the control elements 6 to 8 and rectifiers 5 and 5' need not be incorporated in the projectors, but in this control unit, so that, apart from the elements of a conventional projector, the only addition to each projector would be the terminals required for connection of the control unit.

I claim:

1. In a slide projector control circuit, a projection lamp having a first and a second terminal, a transformer having a secondary winding with a first end and a second end, first and second shunting terminals, first and second external connection terminals, a rectifier element, and current control means, a connection from the first end of the secondary winding to the first lamp terminal, a connection from the first end of the secondary winding to the first external connection terminal, a connection from the second end of the second winding to the first shunting terminal, a connection from the second end of the secondary winding to the rectifier element, a connection from the rectifier element to the second external connection terminal, a connection from the second terminal of the lamp to the second shunting terminal, a connection from the second terminal of the lamp to the current control means, and a connection from the current control means to the second external connection terminal.

2. A slide projector control circuit as recited in claim 1, wherein the secondary winding and the rectifier element provide a half-wave rectified current supply when the shunting terminals are connected together.

3. A slide projector control circuit as recited in claim 2, wherein the current control means comprises a lead-in terminal for connection to a current control signal means.

4. A slide projector control circuit as recited in claim 3, wherein the current control means comprises a circuit having means adapted to control the current of the lamp, said circuit having means for supplying two signals varying in reverse directions and connected to first and second terminals, respectively, for connection to the above named lead-in terminal and to the lead-in terminal of the control circuit of an identical slide projector.

* * * * *